United States Patent [19]

Frederiksen

[11] 3,870,965

[45] Mar. 11, 1975

[54] CURRENT MODE OPERATIONAL AMPLIFIER

[75] Inventor: Thomas M. Frederiksen, Scottsdale, Ariz.

[73] Assignee: Motorola, Inc., Franklin Park, Ill.

[22] Filed: Jan. 8, 1973

[21] Appl. No.: 321,607

Related U.S. Application Data

[63] Continuation of Ser. No. 115,190, Feb. 16, 1971, abandoned, which is a continuation-in-part of Ser. No. 96,904, Dec. 10, 1970, Pat. No. 3,648,154.

[52] U.S. Cl. .................. 330/30 R, 330/19, 330/28, 330/30 D

[51] Int. Cl. .............................................. H03f 3/68

[58] Field of Search ........... 330/9, 19, 26, 28, 30 D, 330/30 R, 69; 307/243

[56] References Cited

UNITED STATES PATENTS 3,214,706 10/1965 Mollinga .......................... 330/19 X

*Primary Examiner*—Michael J. Lynch
*Assistant Examiner*—Lawrence J. Dahl
*Attorney, Agent, or Firm*—Vincent J. Rauner; LaValle Ptak; Maurice J. Jones, Jr.

[57] ABSTRACT

A current mode operational amplifier is shown which is powered by a single voltage supply and operates in response to input signals represented by current values. The input system for the operational amplifier employs an inverting input circuit responsive to a first input signal and a non-inverting input circuit responsive to a second input signal. A current mirror circuit is employed for subtracting one input signal from the second input signal and the difference signal is applied to the operational amplifier.

5 Claims, 20 Drawing Figures

INVENTOR

BY Thomas M. Frederiksen

Mueller & Aichele

ATTY'S.

INVENTOR
Thomas M. Frederiksen
BY
Mueller & Aichele
ATTY'S.

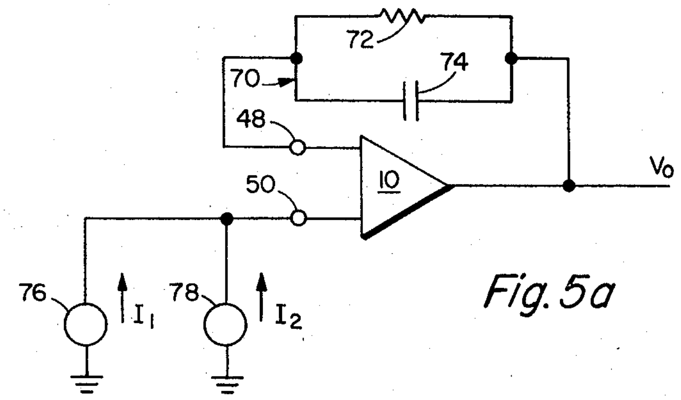
Fig. 5a
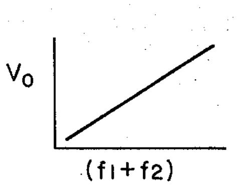
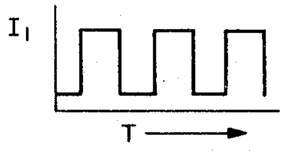
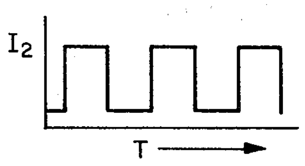
Fig. 5b Fig. 5c Fig. 5d
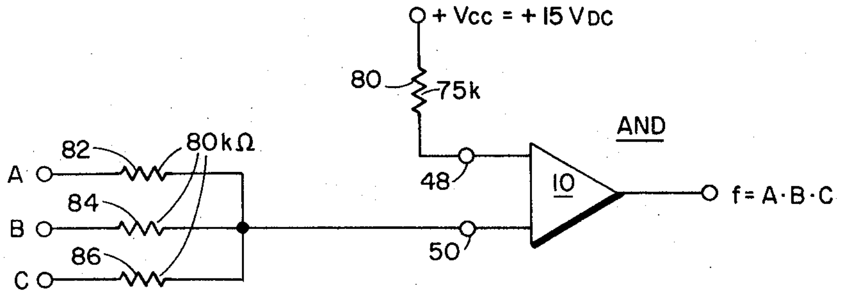
Fig. 6a
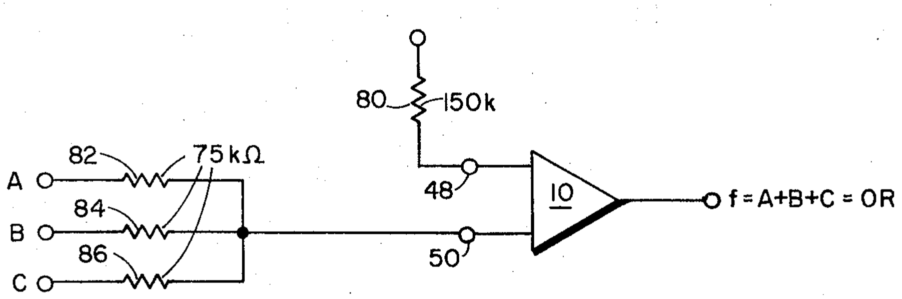
Fig. 6b
INVENTOR
Thomas M. Frederiksen
BY Mueller & Aichele
ATTY'S.

INVENTOR

Thomas M. Frederiksen

BY Mueller & Aichele

ATTY'S.

CURRENT MODE OPERATIONAL AMPLIFIER

This is a continuation of application Ser. No. 115,190 filed Feb. 16, 1971, now abandoned, which in turn is a continuation-in-part of application Ser. No. 96,904 filed Dec. 10, 1970, by Thomas M. Frederiksen and Ronald W. Russell entitled "Start Circuit For Power Supply," now U.S. Pat. No. 3,648,154, issued Mar. 7, 1972.

BACKGROUND OF THE INVENTION

The prior art use of operational amplifiers use a differential amplifier at the input of the operational amplifier to compare voltage levels of the applied input signals. The difference between the applied input signals are amplified by the operational amplifier and are used to represent the difference getween the two input signals.

Generally, these prior art operational amplifiers are powered by a plurality of power supply levels. Representational of these power supply levels are supply values of plus 15 volts and minus 15 volts. Additionally, the input to the operational amplifier responds to voltage levels so the function of the operational amplifier is to compare two input voltages and to get an output voltage from the operational amplifier proportional to the difference between the input coltages.

There are many operational environments in which the plurality of supply values are unavailable and the user is restricted to a single supply value plus ground potential, which for the purpose of this description is defined as a single voltage supply. If the user is limited to a single positive voltage supply, all of the input signal levels applied to an operational amplifier powered by such a single supply are limited to positive values ranging between zero and the power supply value.

Accordingly, the present invention is designed to operate with a single power supply, whereby the two input voltage signals employed as the inputs to an operational amplifier are converted to current signals using input resistance and one signal is subtracted from the other signal using a current mirror. Thereafter, there is an amplification of this current difference.

SUMMARY OF THE INVENTION

The present invention relates to operational amplifiers, and more particularly, it relates to operational amplifiers operating from a single voltage supply and operating in response to input signals represented by values of current applied to an inverting input terminal and a non-inverting input terminal.

It is an object of the present invention to provide a new family of operational amplifiers which operate from a single voltage supply.

It is a further object of the present invention to provide a single voltage operational amplifier which responds to input signals represented by current levels.

It is another object of the present invention to provide an operational amplifier responsive to a single voltage supply, and to input signals represented by current levels and having an inverting input signal terminal and a non-inverting input signal terminal.

It is a still further object of the present invention to provide a single voltage supply operational amplifier employing a current mirror for subtracting one current value available on the non-inverting input terminal from the current value available on the inverting input terminal.

Another object is to provide an operational amplifier having an output voltage which is related to the difference of the input currents multiplied by the value of the feedback resistor.

These and other objects and features of this invention will become fully apparent in the following description of the accompanying drawings, wherein:

FIG. 5A shows a schematic view of a current mode weighted averaging circuit of the sum of two inputs;

FIG. 5B shows an output waveform from the circuit shown in FIG. 5A;

FIGS. 5C and 5D show representational input signals to the current mode weighted averaging circuit;

FIG. 6A shows a current mode AND gate;

FIG. 6B shows a current mode OR gate;

Figures 7A, 7B:
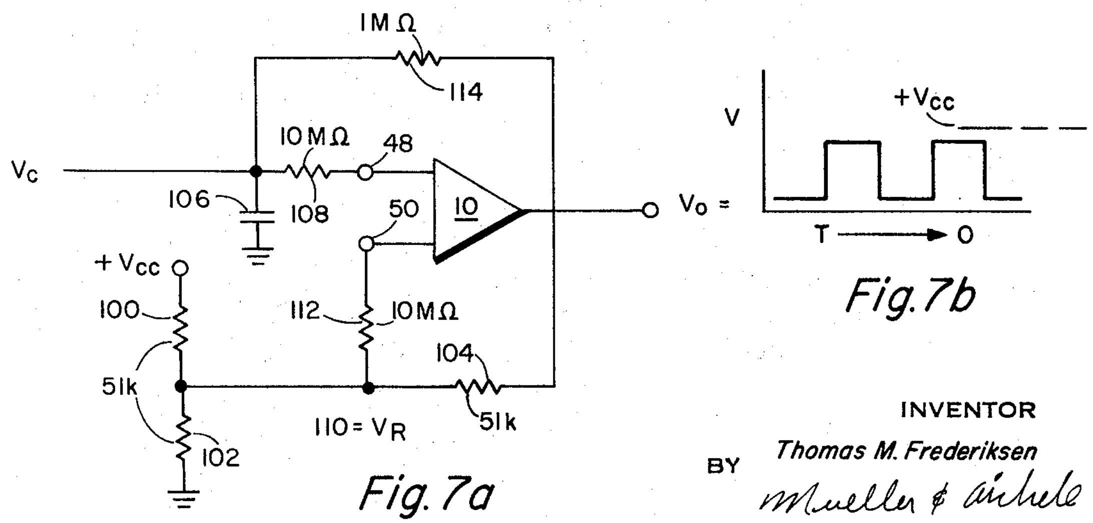

FIG. 7*a* shows a single capacitor current mode astable multivibrator;

FIG. 7B shows the output wave form of the circuit of FIG. 7A.

Figure 1:
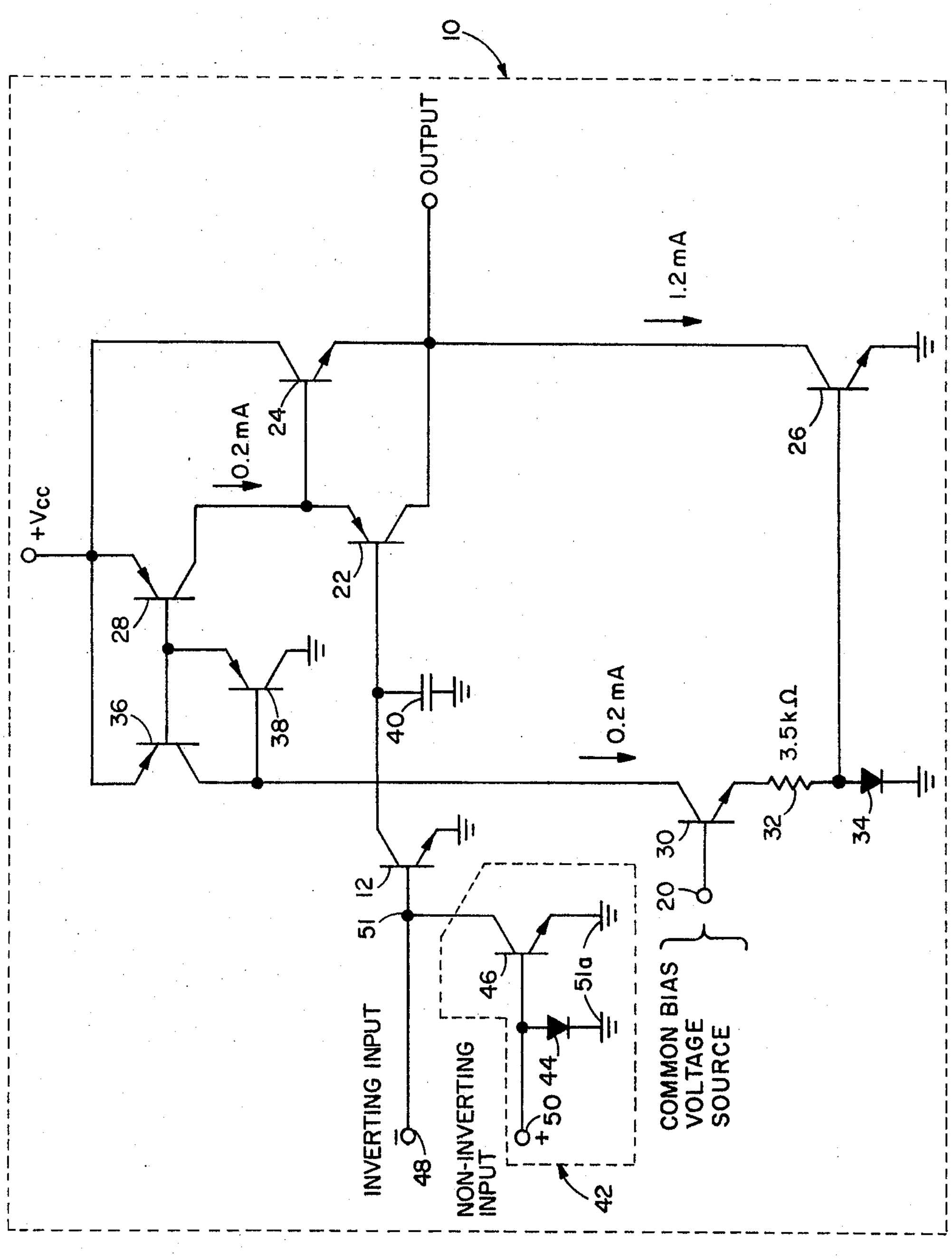
FIG. 1 is a schematic view of a current mode operational amplifier.

The circuit schematic of a single operational amplifier stage 10 is shown in FIG. 1. A common biasing circuit supplies a voltage to all of the amplifiers. This bias voltage is equal to the forward voltage drop of three silicon diodes and is used to bias the current sources of each of the amplifiers and is applied to a terminal 20.

The gain transistor is shown at 12 and the emitter followers are shown at 22 and 24. The output stage class-A NPN current source is provided by a transistor 26. The PNP current source, which serves as the load for the transistor 12, is provided by a lateral PNP transistor 28.

Biasing currents are provided by the transistor 30 which operates off the common bias line available at the terminal 20. A resistor 32 in the emitter of the transistor 30 has one forward diode drop across it which establishes a 200$\mu$A reference current in the diode 34. By scaling the emitter areas between the diode 34 and the transistor 26 a 1.2 mA current is provided in the transistor 26. As the reference 200$\mu$A also exists in the collector of the transistor 30, this is used to bias the PNP current source 28. Biasing of the transistor 28 is accomplished by providing a matched device 36, and making use of device 38 to force the collector current of a device 36 equal to the reference value, 200$\mu$A, as a result of device symmetry. All of the biasing currents are made independent of the magnitude of the power supply voltage by using this referencing technique.

The PNP emitter follower 22 serves to reduce the bias current of the transistor 12 and to provide a low input current (base current of the transistor 12). In addition, the connection of the collector of the transistor 22 to the output reduces the loading at the collector of the transistor 12 due to the output impedance of the transistor 22 and finally the small $V_{EC}$ of the transistor 22 allows a super-$\beta$ device to be used in the circuit (this improves both $h_{FE}$ and $f_t$).

An on-chip capacitor 40 is used to provide internal frequency compensation to insure loop stability for the worst-case closed-loop gain of unity.

The "non-inverting" input function 42 is provided by the "current-mirror" circuit comprising a diode 44 and a transistor 46. Currents which result from both inputs are differences at the inverting input to the amplifier located at the base of the transistor 12 and the difference current flows through an external feedback resistor 54 as, for example, shown in FIG. 2.

The current mirroring action operates in the following manner. The diode 44 and the transistor 46 are matched by using the same geometry and the diode 44 and base-emitter junction are poled in the same direction. As a result, a current value applied to the terminal 50 develops a voltage value over the diode 44 such as to cause transistor 46 to divert current from a node 51 and flow to ground 51a in the same amount or exact value of current that is applied to the terminal 50. Accordingly, the value of current applied to the terminal 50 is subtracted from the node 51. Since the node 51 receives its input current from the signal applied to the terminal 48, in effect, the mirror circuit 42 subtracts current applied to the terminal 50 from the current applied to the terminal 48.

Figure 2:
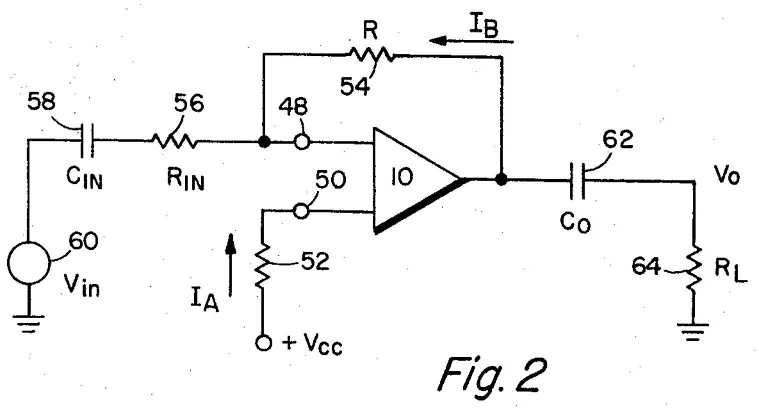
FIG. 2 is a schematic view of a current mode operational amplifier biased at half the power supply voltage to attain maximum signal swing at the output.

Referring to FIG. 2, there can be seen a combination of the current mode operational amplifier and a biasing arrangement for attaining an output signal which is biased at one-half of the power supply voltage such that the output signal can vary about the output bias point. This gives a maximum possible swing because the output signal can go up to nearly the supply voltage level or can go down to approximately ground level. This is achieved by connecting the non-inverting input terminal 50 to the supply voltage $V_{cc}$ by a resistor 52 having a value which is twice as large as a feedback resistor 54.

The AC gain of this device is set by the ratio of resistor 54 to an input resistor 56. Once the AC gain of the device is set, the next step is to bias the output signal. Whenever maximum swing is desired the output quiescent point is biased at one-half the power supply. So, whatever resistance value has been assigned to the resistor 54, a value twice that value is assigned to the resistor 52. Any other desired bias point can be selected by varying the value of resistors 52 and 54 as given by: $Vo_{dc} \cong + V_{cc}[R(54)/R(52)]$.

A capacitor 58 blocks DC components from the voltage input signal represented by a voltage source 60. A capacitor 62 blocks DC components of the output signal applied to a load represented by a resistor to ground 64.

In this manner the current entering the current mirror circuit 42 at the terminal 50 and represented by an arrow $I_A$ equals the current flowing through the resistor 54 and represented by an arrow $I_B$.

Figure 3A:
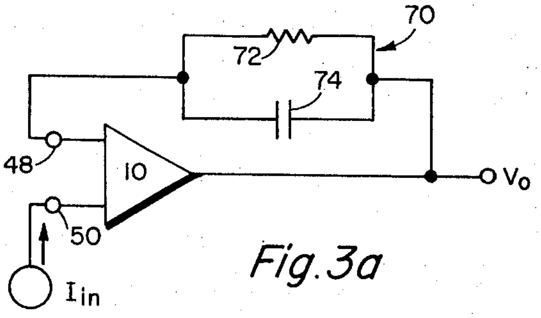
FIG. 3A is a schematic view of a current mode averaging circuit having a single input pulse train and employing a current mode operational amplifier.
Figure 3B:
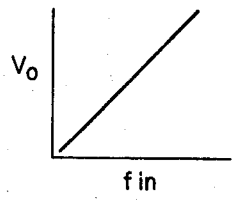
FIG. 3B shows an output waveform from the circuit shown in FIG. 3A.
Figure 3C:
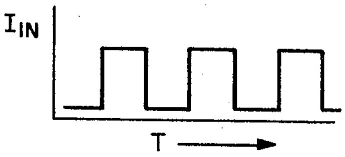
FIG. 3C shows a representational series of pulses applied to the circuit shown in FIG. 3A.

Referring to FIGS. 3A, 3B and 3C, there is shown a circuit employing as a part thereof the current mode operational amplifier 10 used in a pulse averaging mode of operation. FIG. 38 shows the output voltage waveform as a function of the frequency of the input pulse train.

The non-inverting terminal 50 receives a train of pulses as represented by the FIG. 3C. The train of pulses shown in FIG. 3C is a substantially uniform train of pulses. It should be kept in mind that in this figure and the following FIGS. 4C, 4D, 5C and 5D, a wide range of equivalent input signals can be used. When the train of current pulses is applied to the non-inverting input they are applied to the mirror circuit 42 causing pulses of current to be pulled from the output of the circuit 10 through an R-C network 70, which comprises a resistor 72 in parallel connection with a capacitor 74, and then into the inverting input terminal. The DC output signal is a linear function of the input pulse rate and is shown in FIG. 3B. The value of the resistor 72 sets the gain or slope of the output waveform and the value of the capacitor 74 sets the ripple content.

Figure 4A:
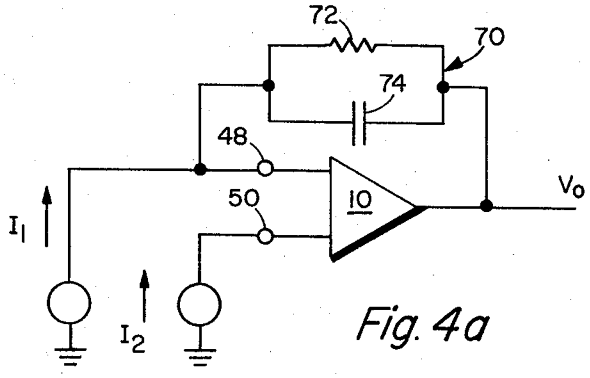
FIG. 4A is a schematic vies of a current mode averaging circuit for averaging the difference between two inputs.
Figure 4B:
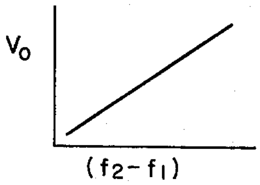
FIG. 4B shows an output waveform from the circuit shown in FIG. 4A.
Figure 4C:
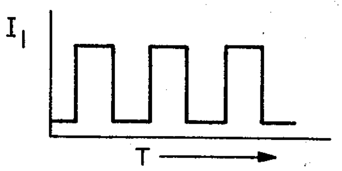
FIGS. 4C and 4D show representational input signals to the current mode averaging circuit.
Figure 4D:
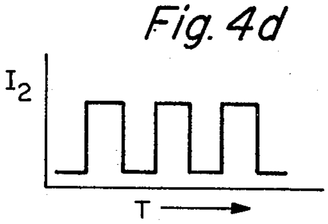

FIG. 4A shows a circuit which functions to average the difference between a pair of input pulse trains. FIG. 4B shows the linear output waveform. FIG. 4C shows the pulse train applied to the non-inverting terminal 50 and FIG. 4D shows the pulse train applied to the inverting terminal 48.

Referring to FIG. 5A, there is shown a circuit for supplying the weighted average of the sum of two inputs. The pair of input signals are both applied to the non-inverting input terminal 50. The current pulse train supplied by a current source 76 is shown in FIG. 5D and the current pulse train supplied by a current source 78 is shown in FIG. 5C. The output waveform is shown in FIG. 5B.

In order to change the slope of the output waveforms shown in FIGS. 3B, 4B and 5B, the inputs are switched between the inverting and non-inverting terminals.

Referring to FIGS. 6A through 6E there can be seen the combination of input means and a current mode operational amplifier for performing logic functions.

An AND function is performed by the arrangement shown in FIG. 6A by connecting the inverting input terminal 48 to the supply voltage by a single resistor 80 and by connecting the non-inverting terminal 50 to a junction of a plurality of resistors shown as 82, 84 and 86. Logic input signals are applied to each remaining end of the resistors 82, 84 and 86. The value of the resistors are chosen such that the signal applied to the inverting terminal predominates unless all the terminals A, B and C receive positive voltage pulses.

FIG. 6B shows an OR circuit of substantially the same configuration except the value of the resistors 82, 84 and 86 when compared to the resistor 80, gives an override on the non-inverting terminal whenever any one of the logic signals A or B or C is applied.

Figure 6C:
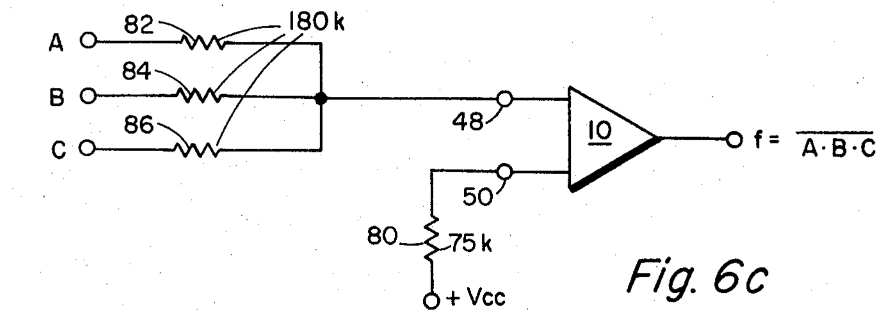
FIG. 6C shows a current mode NAND gate.

FIG. 6C shows a NAND configureation by switching the logic signals to the inverting terminal 48 and by connecting the non-inverting terminal 50 to the power supply voltage by the resistor 80.

Figure 6D:
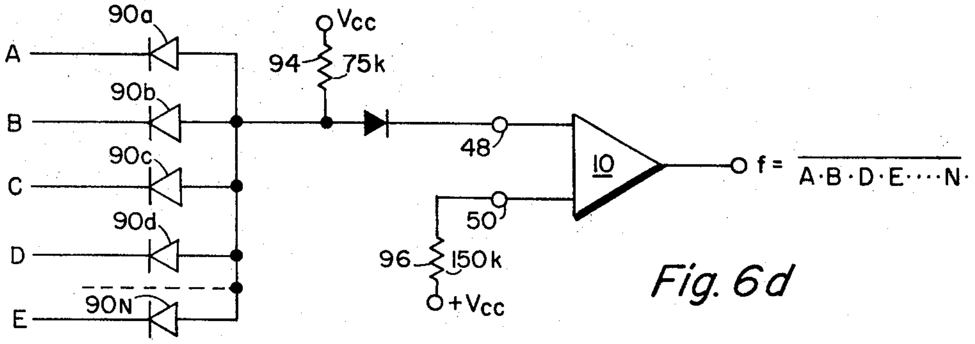
FIG. 6D shows a current mode NAND gate with a large fan in array.

FIG. 6D shows a NAND circuit employing a current mode operational amplifier employing a plurality of diodes 90$a$ through 90$n$ as input means to the inverting terminal in series with an input diode 92. A resistor 94 is connected between the junction of the diode 92 and the common point of the diodes 90a through 90n, and the power supply voltage source $V_{cc}$. The non-inverting terminal 50 is connected to the power supply voltage source by a resistor 96.

Figure 6E:
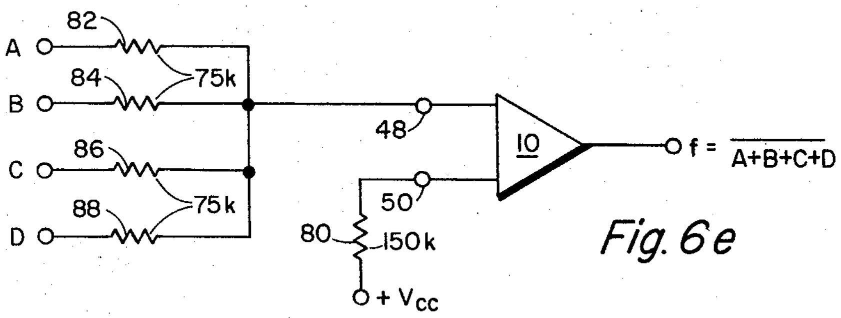
FIG. 6E shows a current mode NOR gate.

FIG. 6E shows a NOR gate employing the combination of a plurality of logic signals applied in parallel over resistance elements 82, 84, 86 and 88 to the inverting terminal 48 and the non-inverting terminal 50 being connected to the power supply by a resistor 80. The ratio of the resistance values being selected to perform the desired function $f = \overline{A \cdot B + C + D}$.

Referring to FIG. 7A there is shown a single capacitor astable multivibrator using a current mode operational amplifier. A resistance network comprising resistors 100, 102 and 104 sets the bias condition for circuit operation. The voltage available at a capacitor 106 and represented by $V_c$ is changed to a current value by a resistor 108 and applied to the inverting terminal 48. The voltage available at the node 110 and represented by $V_R$ is applied to the non-inverting terminal 50 by a resistor 112. The current mode operational amplifier compares the two current values and gives an output switching function as shown in FIG. 7B.

The resistors 100, 102 and 104 establish the symmetry of the output waveform. The frequency of the oscillation is established by resistor 114 and capacitor 106 once the resistors 100, 102 and 104 have been established.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for generating a difference current value between a pair of current mode input signals comprising:

a first transistor having emitter, collector and base electrodes and said collector electrode being connected to a first source of potential and said emitter electrode being connected to a second source of potential different from said first source of potential;

first input means for supplying a current equivalent of a first input signal to said base electrode of said first transistor;

a second transistor having emitter, collector and base electrodes and said collector electrode being coupled with said base electrode of said first transistor and said emitter electrode being coupled with said second source of potential;

a diode matched to said second transistor connected between said base electrode and said second source of potential and poled to conduct current in the same direction as the base-emitter junction of said second transistor for developing a predetermined driving voltage for said second transistor; and second input means for supplying a current equivalent of a second input signal to said base electrode of said second transistor whereby, said second transistor under the influence of said predetermined driving voltage pulls current from said base electrode of said first transistor equal to the value of said second input signal for subtracting said second input signal from said first input signal.

2. In combination:

an operational amplifier operating in response to a single power supply and including as its input stage a first transistor of a predetermined conductivity type having emitter, collector and base electrodes and said collector electrode being connected to a source of positive potential and said emitter electrode being connected to a source of more negative potential;

first input means for supplying a current equivalent of a first input signal to said base electrode of said first transistor;

a second transistor of said predetermined conductivity type having emitter, collector and base electrodes and said collector electrode being connected to said base electrode of said first transistor and said emitter electrode being connected to a source of more negative potential;

a diode matched to said second transistor connected between said base electrode and said source of more negative potential and poled to conduct current in the same direction as the base-emitter junction of said second transistor for developing a predetermined driving voltage for said second transistor; and second input means for supplying a current equivalent of a second input signal to said base electrode of said second transistor whereby, said second transistor under the influence of said predetermined driving voltage pulls current from said base electrode of said first transistor equal to the value of said second input signal for subtracting said second input signal from said first input signal.

3. The combination as recited in claim 2, wherein the source of more negative potential is ground potential, said operational amplifier has an output terminal coupled with the collector of said first transistor, and further including:

a single power supply coupled with the source of positive potential;

a feedback resistor being connected between said output terminal and said first input means;

a bias resistor being connected between said second input means and said single power supply and being related to said feedback resistor such as to fix the output quiescent voltage operating level.

4. The combination as recited in claim 2, wherein said operational amplifier has an output terminal coupled with the collector of said first transistor and further including:

a feedback circuit connected between said output terminal and said first input means; and a first current signal source for applying signals to be averaged to said second input means.

5. The combination as recited in claim 4, and further including:

a second current signal source for applying signals to said first input means to be differenced and averaged with respect to the signals from said first current signal source.

* * * * *